Aug. 30, 1927.

H. C. HEATON

BRAKE

Filed April 8, 1921

Inventor
Herman C. Heaton

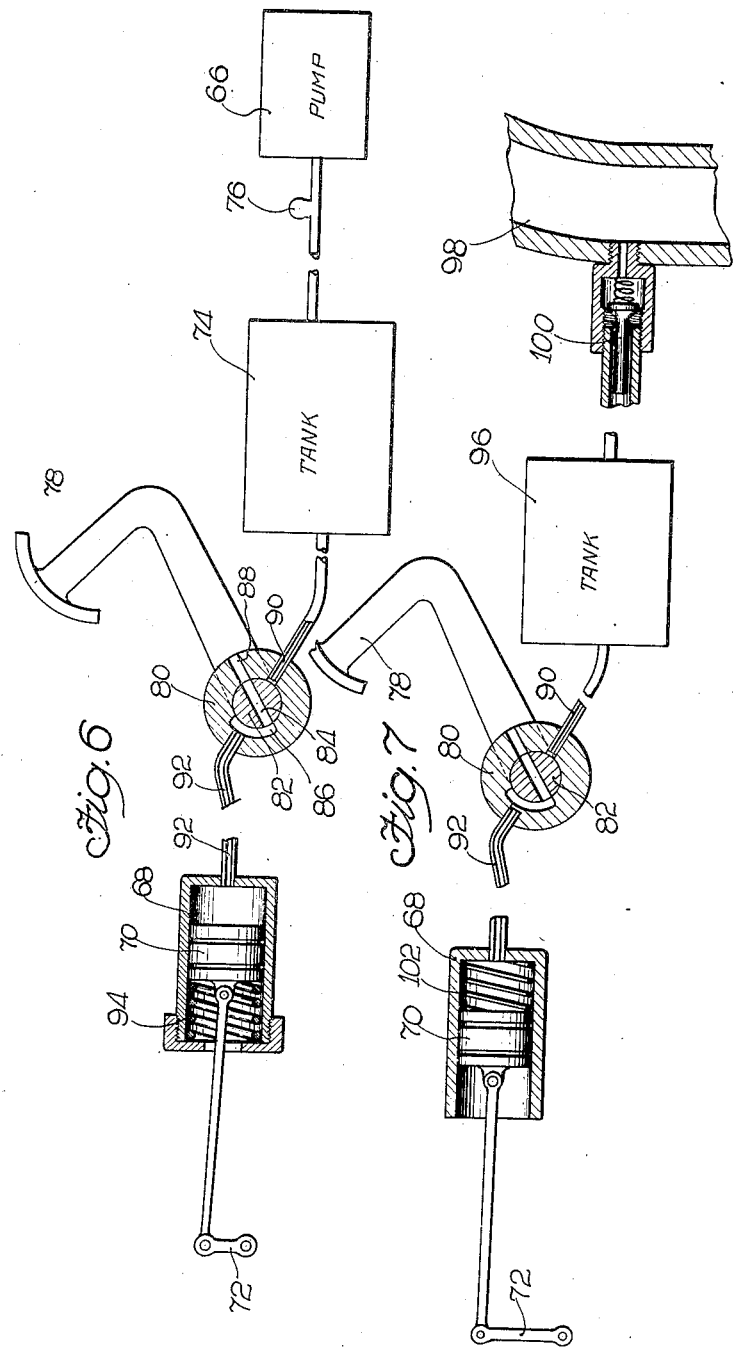

Patented Aug. 30, 1927.

1,640,545

UNITED STATES PATENT OFFICE.

HERMAN C. HEATON, OF BERWYN, ILLINOIS.

BRAKE.

Application filed April 8, 1921. Serial No. 459,570.

My invention relates to braking devices, and more specifically to an improved fluid pressure braking device especially adapted for use on motor vehicles.

The mechanical transmission to the mechanically operated brakes, at present commonly employed on motor vehicles, is objectionable in many respects. It requires a large number of different parts, and relatively complicated mechanism for increasing the force applied by the operator to a force sufficient to contract or expand the brake band and hold the wheel stationary. The yielding and wear of the pivotal supports, which are subjected to very heavy loads, necessitates frequent readjustment of the brake; relatively heavy coil springs are usually necessary to slack off the brakes. All the moving parts employed lie under the body of the car, where they are apt to be broken in travelling over rough roads, and where they become coated with dirt, and are difficult to get at for adjustment or repair.

The chief object of my invention is to eliminate the above mentioned undesirable characteristics by providing fluid pressure means for applying the brake.

Another object is to provide a very simple fluid pressure braking mechanism, durable in service, cheap to manufacture and easy to assemble.

Another object is to provide power means for applying the brake.

Another object is to provide power means for applying a constant braking force, and means controlled by the operator for varying the force.

Further objects and advantages of my invention will become apparent as the description proceeds.

In the accompanying drawings:

Figure 6 is a diagrammatic showing of another device operating by differences of gas pressure, and Figure 7 illustrates another means of obtaining pressure differences to operate the brakes.

Figure 1:
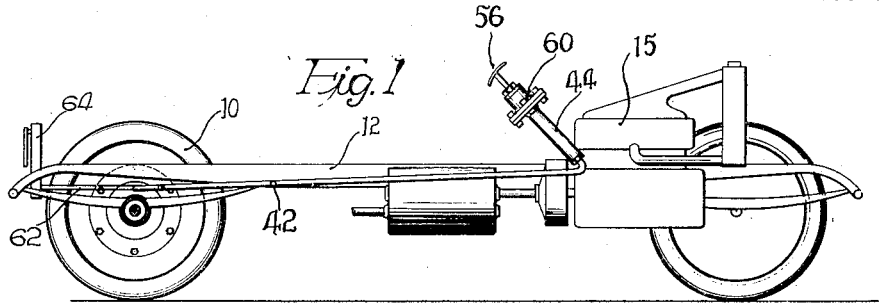
Figure 1 is a fragmentary side view of a running gear of an automobile, illustrating in a diagrammatical way the application of a device constructed according to my invention thereto.

In the embodiment of my invention selected for illustration, the rear wheels 10 are mounted on the running gear 12 in any suitable or preferred manner, and power is transmitted to them through live axles 14 from the power plant 15, by any of the transmission mechanisms well known in the art. As the above mentioned devices are well known, and per se form no part of the present invention, a detailed description of the same is deemed unnecessary.

The wheel 10 is rotatably mounted on the stationary axle 16 by suitable means, such as roller bearings 20, and carries a drum 22 forming a housing for the braking mechanism. The usual emergency brake 23 may be arranged to grip the outsides of the drum 22. A cover plate 24, fastened in place by bolts 26, completes the enclosure, and the cover plate and drum provide opposed annular friction surfaces, with radial faces. The braking element hereinafter to be described may expand to cause friction and retard the rotation of the wheel 10 with respect to the axle 16.

Between the casing and the cover are stationary plates 28 splined to the stationary axle 16 as at 29. Suitable friction facings 30 are carried by the plates 28.

The hydraulic means provided for expanding the plates 28 to apply the brake comprises, in this instance, a thin flat annulus 32, in the nature of a diaphragm adapted to receive pressure fluid between its walls, and by its increase in thickness to increase the spacing between the plates 28 and force the facings 30 into frictional engagement with the drum 22 and cover 24. The resilience of the walls of the annulus 32 is preferably sufficient to cause it to contract when the inside pressure is reduced, and the plates 28 are suitably attached to the annulus as by rivets 33, to positively withdraw the plates and prevent the brakes from dragging. Preferably a spring 61 raises the plunger 46 to create a drop in pressure, so that the atmospheric pressure will slack off the brakes.

The stationary axle 16 carries a flange 36 supporting a fibrous dust seal 37 to protect the parts of the brake from dust and dirt. Snap rings 38 and 40 are preferably provided to hold the annulus 32 in correct axial position with respect to axle 16.

The pressure fluid may be delivered to the diaphragm 32 on each wheel, by means of a tube 42 communicating therewith. I have illustrated a suitable means actuated by the operator for varying the fluid pressure in tubes 42 and diaphragm 32 to apply the brakes.

Figures 2, 3, 4, 5:
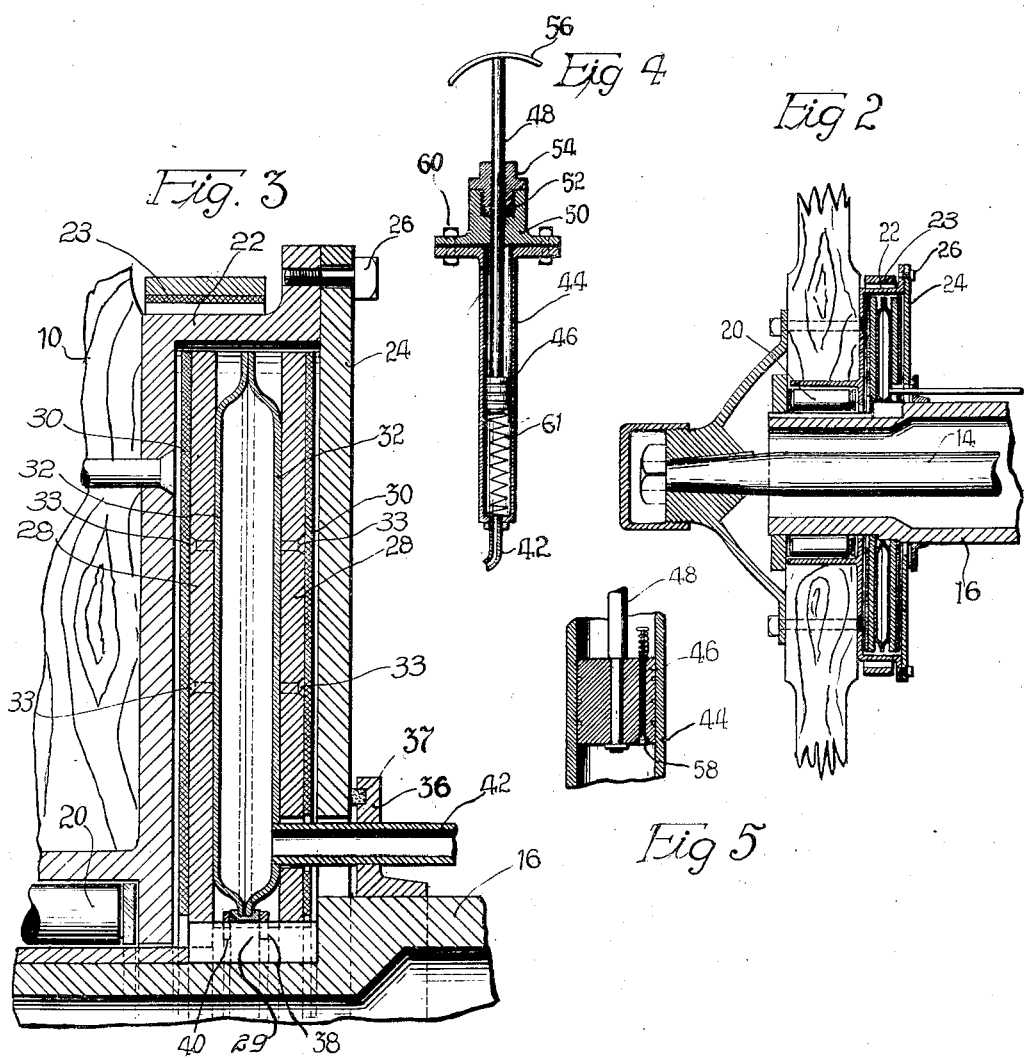
Figure 2 is a section through one of the rear wheels of the motor vehicle illustrated in Figure 1, showing the construction of the braking mechanism proper.
Figure 3 is a much more enlarged section, showing in greater detail the mounting of some of the parts illustrated in Figure 2.
Figure 4 is a section through a suitable pressure supply means.
Figure 5 is an enlarged section through the piston of the same.

Referring to Figure 4, the cylinder 44 receives the piston 46 carried by the piston rod 48 projecting through the cylinder head 50, packing 52 and packing nut 54, and carries at its upper end a suitable shoe or pedal 56, for engagement by the foot of the operator. The piston 46 is preferably provided with a small spring-held check-valve 58, permitting fluid to enter the cylinder, but not to leave it.

In the operation of the improved device disclosed, the diaphragm and connecting tubes and the cylinder below the piston 46 are all completely filled with a relatively incompressible fluid, preferably oil. A small amount of oil is placed in the cylinder above piston 46, and cap 50 is then permanently fastened in place by means of bolts 60. Since the device is practically hermetically sealed, it will be obvious that when the parts are properly adjusted, no readjustment will ever be necessary. Any slight leakage that may occur past piston 46 may be quickly and easily compensated for by pulling up on the shoe 56 to permit the oil above the piston to flow back into place through the check valve 58. It should be noticed that the only connection between the completely housed and protected piston 46, and the completely housed and protected brake diaphragm 32 is the small tube 42, which may be placed in any desired position out of the way, for instance, inside the channels forming the main frame of the chassis. An important feature of the invention resides in the equalizing effect of the liquid, whereby even application of the brakes is assured.

The conduit 42 may obviously be prolonged, as at 62 (see Figure 1) to deliver pressure fluid to actuate any suitable semaphore or signaling device 64 at the rear end of the car. In this way the use of the brakes to slow down will be automatically indicated to those in the rear. The same support may obviously be used as a mounting for any well known type of direction signaling means also.

In Figure 6 I have indicated a pump 66 driven by the engine, and means for controlling the delivery of compressed gas to a suitable cylinder 68 to actuate a piston 70 operatively connected to a brake lever 72 for operating a brake of any well known construction. The pressure fluid from the pump is preferably stored in a tank 74, a safety valve 76 being provided to prevent the development of excessive pressure in the tank.

The application of the brake may be controlled by means of a foot pedal 78 similar to those now customarily employed, and operatively connected to a three-way valve comprising a casing 80 and a valve member 82. In the position illustrated in Figure 6, the brake is not applied, passageway 84 in the valve member connecting chamber 86 with the atmosphere through passageway 88. It will be apparent that depressing the pedal 78 will rotate passageway 84 into register with passageway 90 connected to the tank, whereby pressure fluid will be delivered to the chamber 86 and through conduit 92 to the cylinder 68 to apply the brake. Passageways 88 and 90 are preferably spaced apart so that an intermediate position is provided in which passageway 84 is cut off from communication with either. This makes it possible for the operator to permit a certain pressure to be built up in cylinder 68, and then by moving pedal 78, to shift the valve to the intermediate position, whereby the braking effort already obtained will be maintained indefinitely as long as the pedal 78 is held in the intermediate position. A spring 94 is preferably provided for relieving the brake elements as soon as passageway 84 is moved into register with passageway 88.

It will be obvious that pump 66, tank 74 and valve 82 may be employed for the control of the diaphragm brake illustrated in Figure 3 merely by connecting conduit 92 thereto.

In Figure 7 I have illustrated vacuum storage means in the nature of a storage tank 96 connected to the inlet manifold 98, a check valve 100 being provided adjacent the manifold. It will be obvious that tank 96 may be connected to passageway 90, shown in Figure 6, to form an operative arrangement, except that spring 102 must act in the opposite direction from spring 24. The high suction necessary to prevent the engine from racing whenever it is not operating under a load will exhaust tank 96 and maintain a suitable reserve of power for operation of the brake. It will also be obvious that the signaling device 64 may readily be connected to either of the systems illustrated in Figures 6 and 7.

Without further elaboration, the foregoing will so fully explain the gist of my invention, that others may, by applying current knowledge, readily adapt the same for use under various conditions of service, without departing from certain features properly constituting the essential items of novelty involved, which items are intended to be defined and secured to me by the following claims.

I claim:

1. In combination, a fixed axle, a wheel rotatably journaled upon said axle, said wheel having a pair of spaced brake surfaces rotatable therewith, a pair of spaced brake shoes interposed between said brake surfaces, said brake shoes extending inwardly to the fixed axle and secured directly thereto against rotation with the wheel, the connection between said shoes and the fixed axle being removed from the sides of the shoes and disposed adjacent the axis of the wheel, said connection permitting sliding of said shoes with respect to the fixed axle, a resilient diaphragm between said brake shoes and means for forcing liquid into said diaphragm to expand same and force said shoes apart in opposite directions and into frictional engagement with the rotatable brake surface on the wheel for the purpose of braking rotation of the wheel.

2. In a device of the class described, a fixed axle, an annular casing rotatable with respect to said axle, a fixed flange carried by said axle, fluid pressure means inside said casing for exerting a braking effect thereon, and a stationary conduit extending through said fixed flange for conveying pressure fluid to said fluid pressure means, said casing having two face plates extending in close to the axle to provide two opposed radial braking surfaces.

3. In a device of the class described, in combination, a cylinder opening at one end to a hermetically sealed receiver, a piston in said cylinder, a piston rod entering in said cylinder from the other end, and a check valve in said piston opening toward the receiver end of the cylinder.

4. In a fluid pressure braking system, a system hermetically sealed at all points except one, mechanical means entering the system at said point to develop fluid pressure therein, and means for preventing the development of pressure on the entry side of said mechanical means by said last means.

5. In combination with a motor vehicle having a fixed rear axle, a live axle in said fixed axle, and a wheel rotatably mounted on said fixed axle and driven by said live axle, annular plates rotating with said wheel, annular plates axially slidable but not rotatable on said fixed axle, a resilient annular diaphragm between the plates on said axle, and means for forcing fluid into said diaphragm to expand the same and force said axially slidable plates into frictional engagement with the plates carried by said wheel.

6. In a liquid-braking means, in combination, a system hermetically sealed at all points except one, a piston at the unsealed point for applying pressure to the system, means biasing said piston to a predetermined initial equilibrium position, a check valve in said piston opening into the system, and an additional liquid charge above said piston for sealing said check valve and entering the system through the same to replace losses by differential thermal contraction or by leakage around the piston.

7. In a liquid-braking means, in combination, a liquid-filled system, a piston for applying pressure thereto, an inwardly opening check valve in the piston, and a replacement charge of liquid covering the inlet to said check valve to seal the system against entry of gas.

In witness whereof, I hereunto subscribe my name, this 2nd day of April, A. D. 1921.

HERMAN C. HEATON.